United States Patent [19]
Kuszaj et al.

[11] Patent Number: 5,049,443
[45] Date of Patent: Sep. 17, 1991

[54] STEEL MULTI-LAYERED COMPOSITE MOLDED STRUCTURE

[75] Inventors: Karl T. Kuszaj; Gregory M. Gatarz, both of East Brunswick, N.J.

[73] Assignee: American Standard Inc., New York, N.Y.

[21] Appl. No.: 626,238

[22] Filed: Dec. 12, 1990

[51] Int. Cl.⁵ .................... B32B 15/08; B32B 9/04
[52] U.S. Cl. ........................ 428/332; 428/423.1; 428/425.8; 428/447; 428/448; 428/450; 428/451; 428/457; 428/480
[58] Field of Search ............... 428/457, 447, 448, 450, 428/451, 423.1, 425.8, 420, 332, 458; 427/244, 387

[56] References Cited

U.S. PATENT DOCUMENTS

| | | | |
|---|---|---|---|
| 3,496,058 | 2/1970 | Schroter et al. | 428/425.8 |
| 3,580,796 | 5/1971 | Hick et al. | 428/450 |
| 4,179,537 | 12/1979 | Rykowski | 427/387 |
| 4,341,686 | 7/1982 | Chakrabarti et al. | 427/244 |
| 4,664,982 | 5/1987 | Genovese et al. | 428/447 |
| 4,844,944 | 7/1989 | Grafe et al. | 428/423.1 |
| 4,844,955 | 7/1989 | Grafe et al. | 428/423.1 |

*Primary Examiner*—Thomas J. Herbert, Jr.
*Attorney, Agent, or Firm*—Blum Kaplan

[57] ABSTRACT

A composite structure, e.g. a plastic-backed enameled carbon steel or stainless steel finish product has high impact, delamination and thermal shock resistance. The composite structure is formed from a carbon steel or stainless steel shell having a finish side which may have a polished, ceramic, enameled, polymeric or metallic coating. On the other, non-finish side of the shell a layer of reinforced plastic is bonded directly to the steel or stainless steel shell using silane to form a laminated structure. The finish layer is resistant to deformation and delamination when subjected to relatively high impact applied directly to the finish or to the plastic layer surface, or when the composite structure is subjected to a sudden temperature change.

16 Claims, 4 Drawing Sheets

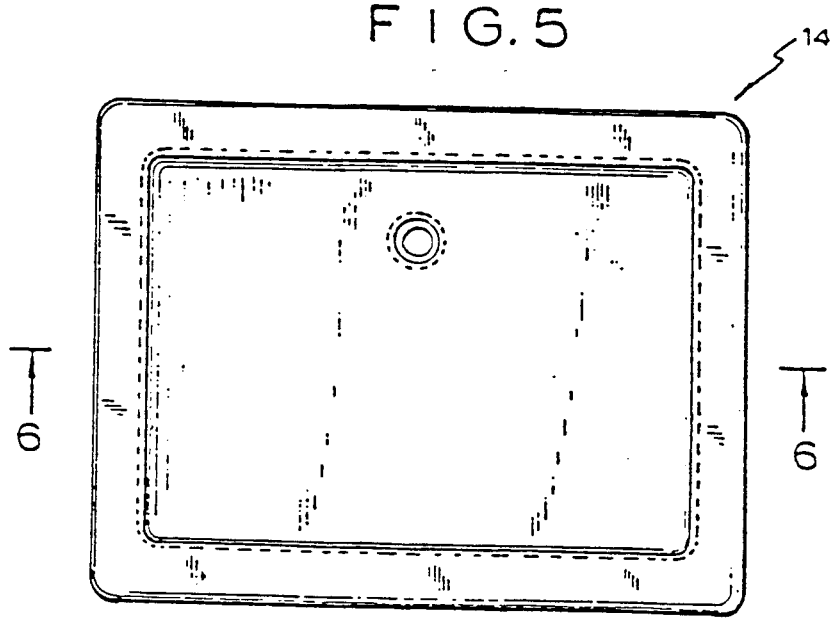
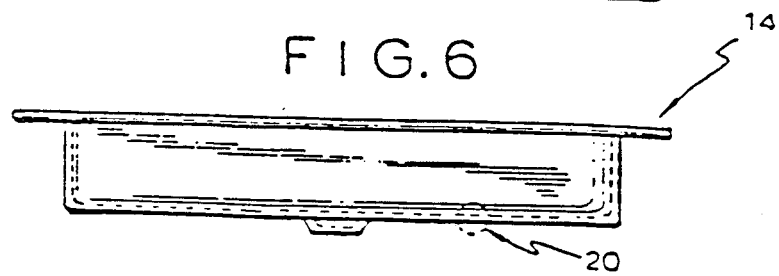
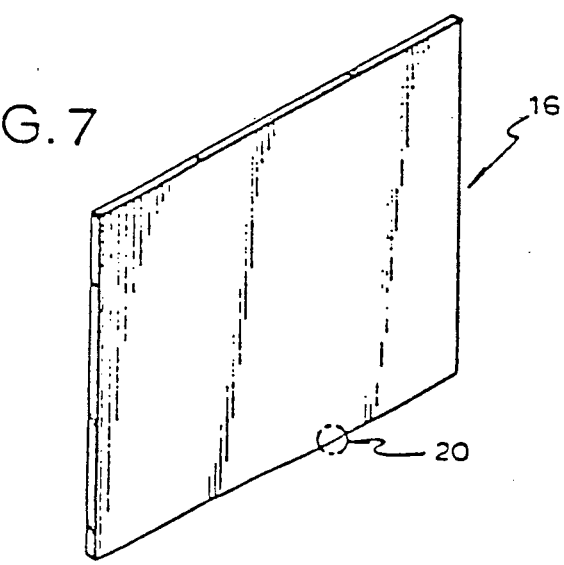

STEEL MULTI-LAYERED COMPOSITE MOLDED STRUCTURE

This is a continuation of application Ser. No. 07/400,289, filed on Aug. 29, 1989, abandoned.

BACKGROUND OF THE INVENTION

1. Field of the Invention

This invention relates to a steel multi-layer composite molded structure, more particularly to a composite structure having a plastic foam material chemically bonded by silane directly to a carbon steel or stainless steel substrate to impart resistance to delamination when subjected to impact and/or thermal shock.

2. Background of the Prior Art

In the development of bathroom and kitchen fixtures, as well as whirlpool tubs and other composite articles, the porcelain-cast iron fixtures have gradually been replaced by lighter and more resilient composite structures. One of the difficulties with the porcelain-cast iron and enameled fixtures has been their susceptibility to impact damage and their extreme weight which cause great difficulties in moving and installing large fixtures such as sinks, bathtubs and whirlpool tubs. The porcelain cast-iron fixtures did have the advantage of having a very solid feel and high weight bearing capability.

Initial attempts by the industry to replace these porcelain cast-iron fixtures proved difficult. The thin stainless steel fixtures did not have the solid feel or structural strength required for large articles such as sinks bathtubs and whirlpool tubs. The early composite structures have a plastic, hollow feel and would deform, crack, chip or delaminate when subjected to impact, thermal shock or the weight of a typical bather. Also, these composite structures would often delaminate, crack, craze or chip when subjected to impact from the outside of the structure during manufacturing, transportation and installation of the fixture.

One attempt to make a lightweight metallic composite structure is exemplified in U.S. Pat. No. 3,496,058 which describes the use of a semi-elastic layer containing particulate material, such as sand, applied to one side of an aluminum sheet To this semi-elastic layer, a plastic foam is applied. The aluminum is difficult to form into a resilient structure and can be easily dented and deformed when subjected to impact or structural stress. Therefore, the use of this type of aluminum composite would be impracticable in the manufacture of plumbing fixtures due to its lack of structural integrity, the difficulty of molding aluminum sheets into articles, and the susceptibility of aluminum to pitting and corrosion.

One successful solution to these problems is disclosed in U.S. Pat. No. 4,664,982 to Genovese et al. the disclosure of which is incorporated by reference herein It discloses a composite enameled steel fixture which has both the look and feel of the earlier porcelain cast-iron fixtures. The composite structure is light, has high structural strength, and resists delamination, chipping and denting due to impact or thermal shock. The composite structure is formed from a steel shell, enameled on both its finish and non-finish sides The shell is used as part of a mold to form a layer of reinforced foamed plastic by Reaction Injection Molding ("RIM"), or by Reinforced Reaction Injection Molding ("RRIM") processing on the non-finish side The reinforced foamed plastic is chemically bonded to the enameled steel non-finish side by the action of silane. Silane is a coupling agent which creates chemical linkages between the SiOH groups in the enamel and the reinforced foamed plastic to form the laminate The composite structure possesses excellent physical and mechanical properties as a result of the chemical bonding of the reinforced foamed plastic layer to the enamel bonded to the steel shell. The structure, however, has two drawbacks The first, is that the steel article must be coated with enamel on its outer, non-finish side prior to lamination The second, is that the delamination resistance of the article is limited by the strength of the bond between the enamel layer and the steel shell layer, which is weaker than the bond created by silane between the enamel layer and the reinforced foamed plastic layer.

An alternative approach to these problems was to replace the enameled-steel shell with a polymeric, cosmetic surface layer and binding that layer directly to a foamed plastic substrate, i.e. a cross-linked isocyanate-modified thermosetting unsaturated polyester foam resin to provide a high impact strength, delamination-resistant structure. Methyl methacrylate and commercially available adhesive THIXON 416, manufactured by Whittaker Corp., West Alexandria, Ohio, which contains a blend of 65% solvents, 35% solids including polyurethane phenolic and epoxy resins, is used as a primer to cross-link and chemically bond the polymeric cosmetic layer with the isocyanurate groups in the foamed plastic while the plastic is cured. This approach is disclosed in U.S. Pat. Nos. 4,844,944 and 4,844,955, both to Grafe, et al., the disclosure of which is incorporated by reference herein. Thus, lightweight and durable plumbing fixtures, including bathtubs, shower receptors, lavoratories, sinks, etc. could be formed utilizing this method. Although these structures are light and delamination-resistant, they do not have the same sound, feel and texture as the prior porcelain-coated cast-iron structures or the enamel coated composite described in U.S. Pat. No. 4,664,982.

Accordingly, it is an object of the present invention to provide a stainless steel or enamel coated carbon steel structure which has the feel of a porcelain-coated cast iron fixture without the weight and delamination problems associated with such structures It is also an object of the present invention to provide a composite enameled carbon steel or stainless steel structure which does not require an enamel coating on its non-finish side and has a RIM or RRIM formed relatively thick, reinforced, foamed plastic layer bonded to its non-finish side to provide a fixture which is highly resistant to delamination.

Another object of the present invention is to provide a plastic backed enameled-carbon steel or stainless steel plumbing fixture that is resistant to chipping, cracking, crazing, delamination or deformation when subjected to impact from either the finish or non-finish side, as when compared to presently available porcelainized cast-iron, enameled-carbon steel or composite plumbing products of comparable weight and gauge.

SUMMARY OF THE INVENTION

These and other objects are achieved by the present invention which provides a multilayered carbon steel or stainless steel shell structure which includes a stainless steel, carbon steel, enameled steel or polymer coated steel finish on one side of the shell, and an uncoated carbon steel or surface on the non-finish side of the shell. The non-finish side is chemically bonded to a foamed plastic substrate layer which upon curing while in contact with the surface of the uncoated steel surface becomes chemically bonded due to the action of silane, a highly-reactive coupling agent.

The composite structure can be formed in RIM, RRIM, Resin Transfer Molding ("RTM") or by spray-up or hand lay up operations Surprisingly, the action of silane causes the thick plastic foam-reinforced layer to chemically bond directly to the carbon steel or stainless steel surface even more strongly than when bonded to enamel coated steel.

For better understanding of the present invention, reference is made to the following description and examples taken in conjunction with the accompanying tables and figures, the scope of which is pointed out in the appended claims.

BRIEF DESCRIPTION OF THE DRAWINGS

FIG. 5 is a top plan view of an enameled-carbon steel shower receptor constructed in accordance with the present invention.

FIG. 6 is an elevational view of the shower receptor of FIG. 5.

FIG. 7 is an isometric view of an enameled-carbon steel panel constructed in accordance with the present invention.

DETAILED DESCRIPTION OF THE INVENTION

Figure 1:
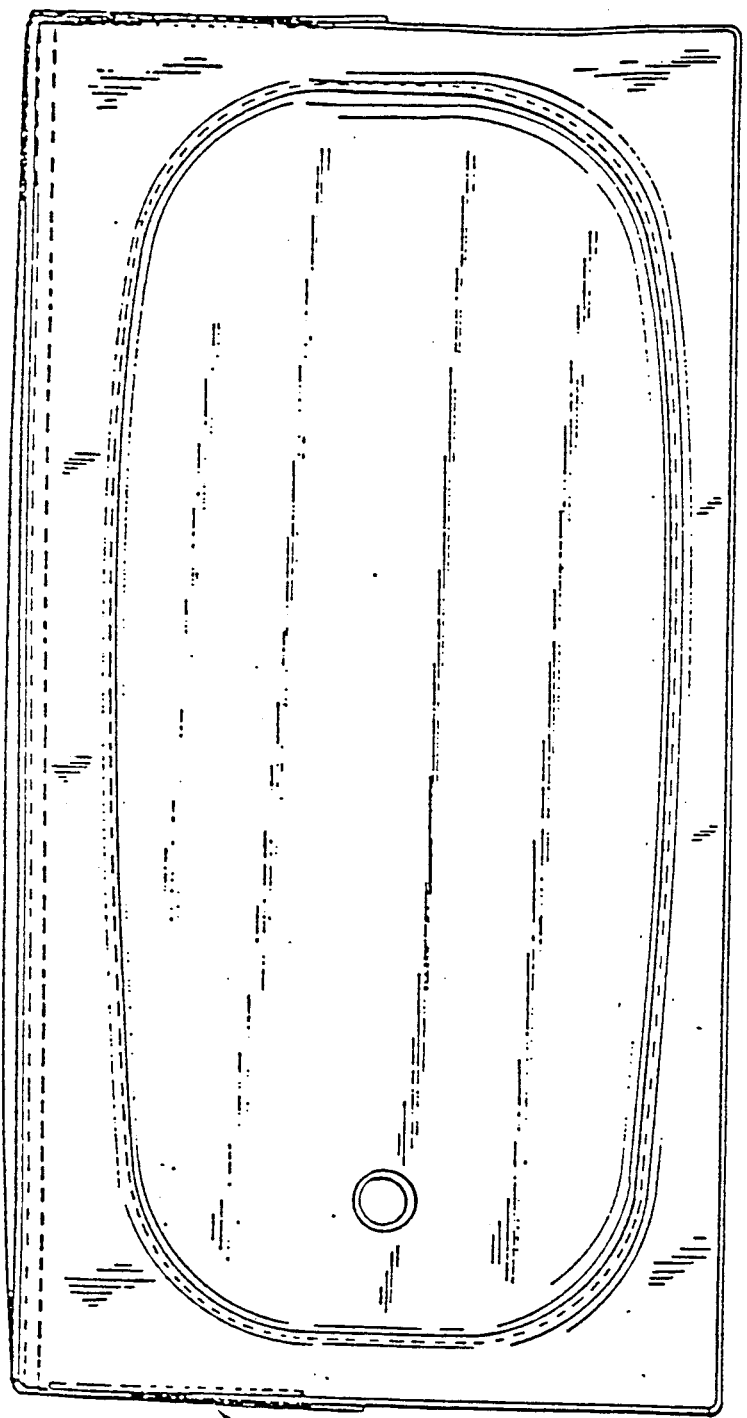
FIG. 1 is a top plan view of an enameled-carbon steel bathtub constructed in accordance with the present invention.
Figure 2:
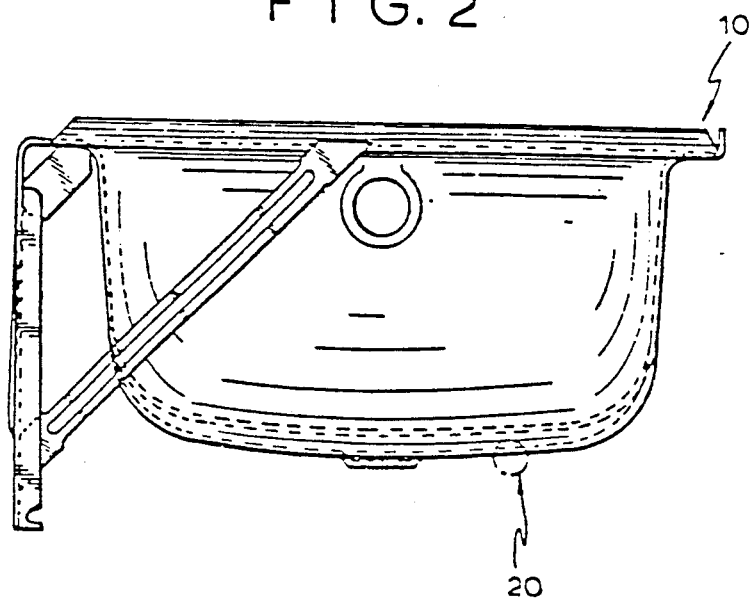
FIG. 2 is an elevational view of one end of the bathtub of FIG. 1.
Figure 8:
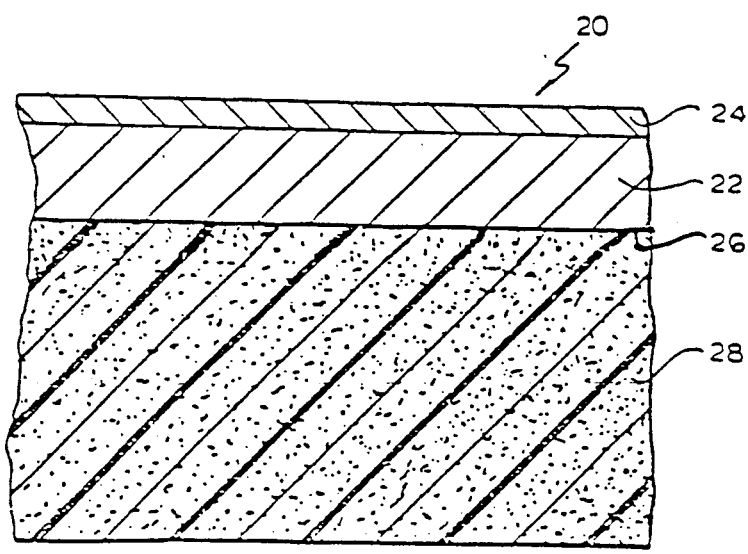
FIG. 8 is a greatly enlarged view taken from within the broken line circles of FIGS. 2, 4, 6 and 7 which illustrates the composite structure of the present invention.
Figure 3:
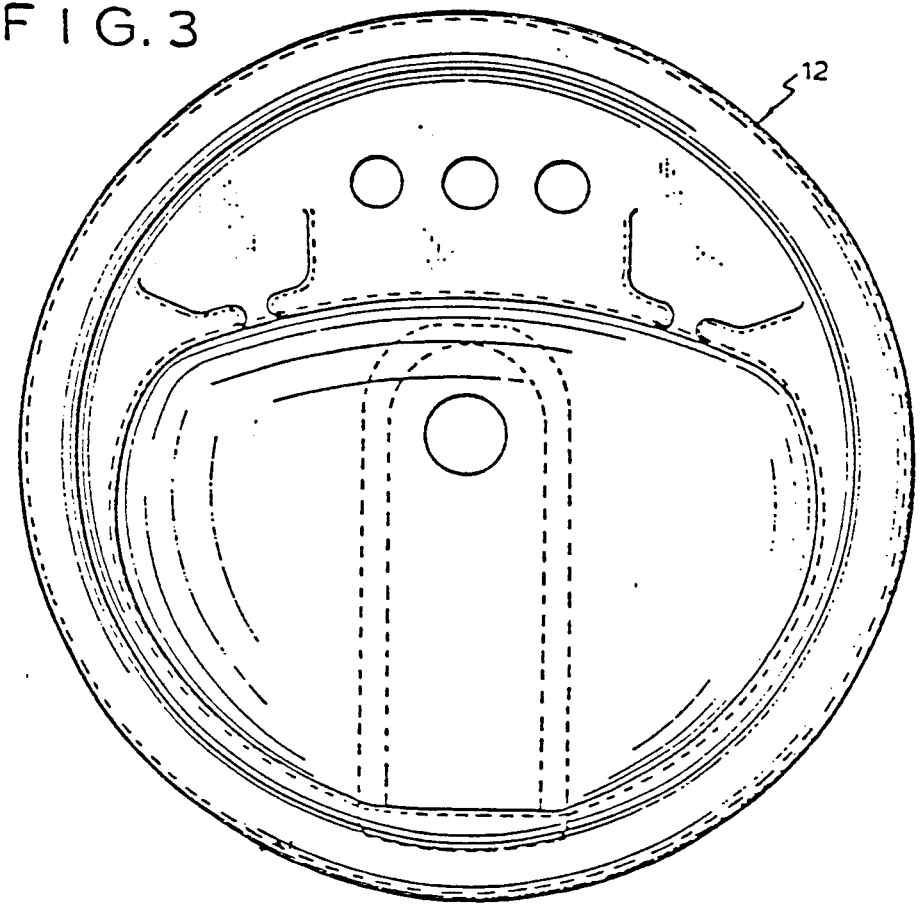
FIG. 3 is a top plan view of an enameled-carbon steel bathroom sink constructed in accordance with the present invention.
Figure 4:
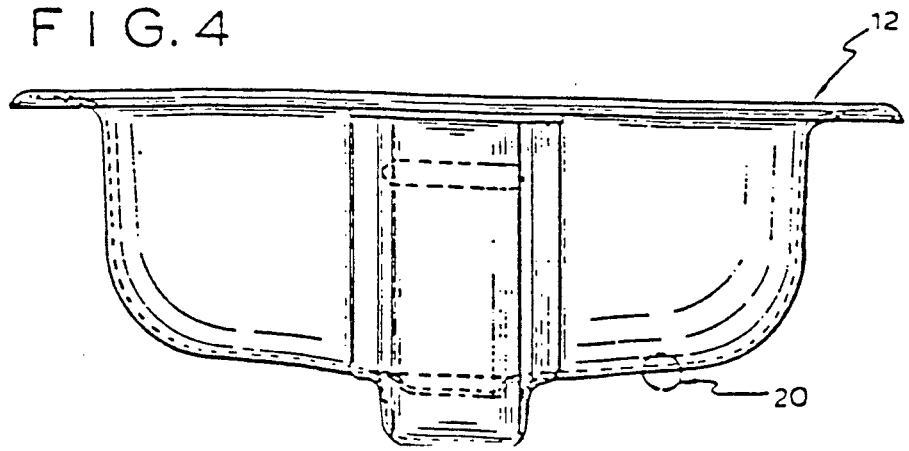
FIG. 4 is an elevational view of the bathroom sink of FIG. 3.

The enameled-steel, composite plumbing fixtures shown in FIGS. 1-6, and an enameled-carbon steel wall panel such as is used for bathtub surrounds or shower stalls shown in FIG. 7 are constructed in accordance with the present invention. These articles are all formed having the composite structure 20 illustrated in FIG. 8. Composite structure 20 includes a steel substrate 22 to which an enamel finish layer 24 is bonded to the finish side of the carbon steel substrate 22. Alternatively, the steel substrate 22 may be comprised of carbon steel or uncoated stainless steel or it may be coated with metallic or other ceramic or polymeric materials on its finish side. Generally, the enamel or finish layer 24 may have a thickness from about 1/128 to about 1/32 of an inch, although other thicknesses may be used. The enamel generally is composed of inorganic oxides with high concentration of silicon dioxide ($SiO_2$), forming a glassy layer when fused to the finish side of the steel substrate 22.

Once the shape of the fixture or article has been formed, i.e. by stamping a sheet of carbon steel or stainless steel, and the finish has been applied, for example by polishing the stainless steel, by baked-enamel process or by application of a metallic, polymeric or other coating, a plastic layer 28, preferably a foamed polyester or polyether is bonded directly to the non-finish carbon steel or stainless steel surface 26 of the fixture. The plastic may be applied for example, by spray-up, hand lay-up, RIM, RRIM, or RTM processes.

The steel structure 22 is bonded directly to the plastic layer 28 using silane coupling agents such as vinyl silane, for example, 3[2(vinyl benzylamino) ethylamino] propyltrimethoxy silane. Various compositions for the plastic layer are discussed in detail in commonly assigned U.S. Pat. Nos. 4,844,944 and 4,844,955, respectively. The disclosure of both of these patents have been incorporated by reference herein.

The thickness of the plastic layer 28 may vary. For example, in the bathtub shown in FIGS. 1 and 2, the side walls may have a thickness of plastic 28 of as little as ⅛ of an inch, and the base sump may have a thickness of plastic 28 of as little as ¼ of an inch. Such thicknesses are adequate to provide an effective amount of plastic 28 on bathtub 10 so that it is resistant to chipping, cracking, crazing, deformation and delamination when subjected to impact forces of energy levels which would damage an unreinforced product. Also, the plastic layer 28 resists delamination when subjected to thermal shock.

Various resins may be used in practicing the present invention, for example, unsaturated polyester containing vinyl monomer, epoxy, polyurethane, isocyanate, nylon and others. The resin may either be foamed or unfoamed, with or without a filler such as glass fibers and/or aluminum trihydrate when bonded to the steel or stainless steel non-finish side 26 of the substrate 22.

The resin can be filled to provide reinforcement by any suitable material, for example, glass spheres, fibers, and weaves, ceramic spheres and fibers, boron, carbon fibers, graphite, and wollastonite an aromatic polyamide fiber by Dupont Company, and others.

The enameled-steel, stainless steel, or other finish steel fixture is incorporated into the composite structure by means of insert-molding techniques. The resin mixture is introduced into the mold to provide a packing factor of from about 20% to 100%. The packing factor is the ratio of the volume of resin mixture to the volume of the mold.

A typical resin mixture is formulated of the following compounds and materials.

TABLE I

| Resin Components | Parts |
|---|---|
| Unsaturated Polyester Resin Containing Vinyl Monomer (Pioneer 236) | 100 |
| Aluminum Trihydrate | 100 |
| ¼ Chopped Fiberglass (OCF 832-FC) | 5 |
| Cumene Hydroperoxide | 0.5 |
| Dimethylethanolamine | 3.5 |
| Polymethylene Polyphenylisocyanate (Upjohn Papi 901) | 10 |
| Silicone Surfactant (Dow Corning 193) | 0.3 |
| Pigment | 0.5 |
| Water | 0.25 |

In practicing the invention, it is preferred that the RIM or RRIM process is employed although other means for applying the resin, whether it is foamed or unfoamed, may be used. For example, an enameled-steel plumbing fixture such as a bathtub is placed in a mold in which a resin, such as an unsaturated polyester containing a vinyl monomer, with or without a filler, a reinforcement, a surfactant, a catalyst, a blowing agent and a vinyl silane coupler which can be part of the mixture, or preferably is first applied to the fixture as a primer, are mixed under high pressure, injected into the mold, and allowed to cure. The mold cycle is at least three (3) minutes for particulate composite structures or about six (6) minutes for a bathtub.

After curing, the enameled steel plastic backed bathtub is removed from the mold. The resulting plastic-backed bathtub has a resin foam layer of an unsaturated polyester-polyurethane copolymer bonded directly to the non-finish steel surface. The bathtub is resistant to delamination when subjected either to high impact forces or thermal shock. Further, the finish enamel surface 24 is resistant to chipping, cracking or crazing when subjected to direct impact forces and resists deformation and pop-off when subjected to reverse forces such as those encountered during manufacture, installation or shipping.

EXAMPLES

Examples 1 and 2

These examples show that the physical properties and characteristics of the plastic-backed enameled-carbon steel finish (or other coated carbon steel or stainless steel) composite structures of the present inventions are equal to, or better than, the physical properties or characteristics of existing state-of-the-art sanitaryware products. The improved product performance is exemplified by the impact and delamination test results shown in the following tables.[1] Table II shows the impact that is required to cause damage to the enamel or steel surface when the impact is applied to the finish surface of sanitaryware. This is the type of damage that may result during and after the installation of the fixture. Table II shows the results of the reverse-impact test, that is, when the load is applied to the plastic-backed surface of the sanitaryware. This is the type of damage caused by handling, transportation, and installation. L6 (1) Testing procedure followed is that of American National Standard Z 124.1-1980 4.3 Impact loads except that the test area has a 3" unsupported diameter.

TABLE II

| Sanitaryware | Direct Impact Impact To Cause Damage[2] To Finished Surface (Ft-Lb) |
|---|---|
| Fiberglass-Reinforced Polyester/Gel Coat | 1.50 |
| Fiberglass-Reinforced Polyester/Acrylic | 2.00[3] |
| Enameled Steel | 1.25 |
| Enameled Cast Iron | 1.75 |
| Plastic-Backed two sided Enameled Steel of U.S. Pat. No. 4,664,982 | 2.50 |
| Plastic-Backed steel finish surface of the structure of the present invention | 2.50 |

TABLE III

| Sanitaryware | Impact To Cause Damage[2] To Finished Surface (Ft-Lb) |
|---|---|
| Fiberglass-Reinforced Polyester/Gel Coat | 1.0 |
| Fiberglass-Reinforced Polyester/Acrylic | 2.5 |
| Enameled Steel | 1-2 |
| Enameled Cast Iron | 1-2 |
| Plastic-backed two sided Enameled Steel of U.S. Pat. No. 4,664,982 | 5 |
| Plastic-backed steel finish surface of | 6.0 |

TABLE III-continued

| Sanitaryware | Impact To Cause Damage[2] To Finished Surface (Ft-Lb) |
|---|---|
| the structure of the present invention | |

[2]Damage as defined as a craze, dent or material delamination of the finished surface layer.
[3]Incipient structural damage with surface cracking observed at an impact energy level of 4.0 ft-lbs.

Example 3

Another physical property of the plastic-backed enameled-steel structure of the present invention is its ability to resist thermal shock. A prototype stainless-steel plastic backed double-bowl kitchen sink was placed in an oven at a temperature of approximately 180° F., thereafter the sink was removed from the oven and immediately placed in a large freezer at a temperature of 0° F. The change in temperature of 180° F. did not cause delamination of the plastic layer from the stainless-steel sink.

Example 4

In order to compare the bonding strength of the plastic backed samples to (1) carbon steel, with and without silane primer, (2) stainless-steel, with or without silane primer and (3) enameled carbon steel with and without silane primer, a number of specimens were tested in accordance with Engineer-ing Standard GA202, except that 1"×1" specimens were utilized instead of the 1"×3" specimens described in the standard. The samples were held in an INSTRON ® Universal Testing Instrument, Model No. 1123, manufactured by Instron Corp., Canton, Mass. 02021, and a wedge was driven at the interface of the plastic backing and steel or enamel surface. Table IV show that the stainless steel and carbon steel samples prepared with the silane primer in accordance with the present invention show superior bonding over both the unprimed samples, and the two-sided enameled samples prepared according to U.S. Pat. No. 4,684,982 in which the plastic layer was bonded to a ceramic layer.

TABLE IV

| Sample | Load to Failure (lbs.) | Penetration of Wedge Extension to Failure (in.) | Remarks |
|---|---|---|---|
| Carbon Steel w/o primer | | | |
| #1 | 60 | 0.12 | Delaminated |
| #2 | 62 | 0.04 | Delaminated |
| #3 | 60 | 0.12 | Delaminated |
| #4 | 49 | 0.12 | Delaminated |
| #5 | 62 | 0.03 | Delaminated |
| #6 | 65 | 0.06 | Delaminated |
| Carbon Steel w/silane primer in accordance w/ the present invention | | | |
| #1 | 153 | 1.0 | Foam still stuck |
| #2 | 143 | 1.0 | Foam still stuck |
| #3 | 147 | 1.0 | Foam still stuck |
| #4 | 150 | 1.0 | Foam still stuck |
| #5 | 151 | 1.0 | Foam still stuck |
| #6 | 142 | 1.0 | Foam still stuck |
| Stainless steel bonded to plastic w/o primer | | | |
| (Sample delaminated while being cut) | | | |
| Stainless steel w/silane primer in accordance w/ the present invention | | | |
| #1 | 80 | 1.0 | Foam still stuck |
| #2 | 123 | 1.0 | Foam still stuck |
| #3 | 130 | 1.0 | Foam still stuck |
| #4 | 105 | 1.0 | Foam still stuck |
| #5 | 130 | 1.0 | Foam still stuck |

TABLE IV-continued

| Sample | Load to Failure (lbs.) | Penetration of Wedge Extension to Failure (in.) | Remarks |
|---|---|---|---|
| #6 | 80 | 1.0 | Foam still stuck |
| Enam-carbon steel w/o primer | | | |
| #1 | 100 | 1.0 | Some foam stuck, ground coat peeled off |
| #2 | 65 | 0.71 | Half foam stuck, half delaminated |
| #3 | 140 | 1.0 | Most foam still stuck |
| #4 | 115 | 0.32 | Little foam stuck, ground coat peeled off |
| #5 | 100 | 1.0 | Some foam stuck, ground coat peeled off |
| #6 | 115 | 0.58 | Some foam stuck, ground coat peeled off |
| Two-sided Enameled carbon steel w/silane primer in U.S. Pat. No. 4,664,982 | | | |
| #1 | 113 | 0.40 | Little foam stuck, ground coat peeled off |
| #2 | 115 | 0.38 | Little foam stuck, ground coat peeled off |
| #3 | 108 | 0.47 | Little foam stuck, ground coat peeled off |
| #4 | 113 | 0.30 | Little foam stuck, ground coat peeled off |
| #5 | 121 | 0.60 | Little foam stuck, ground coat peeled off |
| #6 | 111 | 0.57 | Little foam stuck, ground coat peeled off |

The results of the bonding strength delamination tests summarized in Table IV conclusively show the surprisingly superior bonding strength of panels constructed in accordance with the present invention. These tests show that the action of silane causes the plastic foam reinforced layer to chemically bond directly to the carbon steel or stainless steel surface of the non-finish side in accordance with the present invention, even more strongly than when such plastic layer is bonded to enamel coated carbon steel in accordance with U.S. Pat. No. 4,664,987.

Thus, while there have been described what are the presently contemplated referred embodiments of the present invention, further changes and modifications could be made by those skilled in the art without departing from the scope of the invention, and it is contemplated to claim all such changes and modifications.

What is claimed is:

1. A durable impact, thermal-shock, and delamination resistant composite laminate structure which comprises:
   a steel substrate having a finish and non-finish surface; and
   a layer of plastic chemically bonded directly to said non-finish steel surface utilizing a silane coupler to form a reinforced laminate.

2. The composite laminate structure in accordance with claim 1 in which said plastic layer has a thickness of at least about ⅛ inch.

3. The composite laminate structure in accordance with claim 1, in which the structure has the configuration of a plumbing fixture.

4. The composite structure in accordance with claim 1 in which said plastic is a foam having a packing factor between about 20% and about 100% by volume.

5. The composite laminate structure in accordance with claim 1, in which said steel substrate has a ceramic finish surface.

6. The composite laminate structure in accordance with claim 1, in which said steel substrate is stainless steel.

7. The composite laminate structure in accordance with claim 1, in which said plastic is an unsaturated polyester-polyurethane copolymer.

8. The composite laminate structure in accordance with claim 1, wherein said silane coupler is 3[2(vinyl benzylamino)ethylamino]propyltrimethoxy silane.

9. The composite laminate structure in accordance with claim 1, wherein said steel substrate has a polymeric finish surface.

10. The composite laminate structure in accordance with claim 1 wherein said steel substrate has a metallic finish surface.

11. The composite laminate structure in accordance with claim 1, in which said plastic is reinforced by a material selected from the group consisting of glass spheres, glass fibers, glass weaves, ceramic fibers, ceramic spheres, boron, carbon and graphite fibers, wollastonite and aromatic polyamide fiber.

12. The composite laminate structure in accordance with claim 11, in which said plastic is a glass-reinforced unsaturated polyester-polyurethane copolymer.

13. The composite laminate structure of claim 11, wherein said plastic layer has a density between 20 lbs. per cu. ft. and 125 lbs. per cu. ft.

14. The, composite laminate structure in accordance with claim 11, in which said plastic is an unsaturated polyester-polyurethane copolymer foam.

15. The composite laminate structure in accordance with claim 11, in which said plastic contains a surfactant.

16. The composite laminate structure in accordance with claim 11, wherein said steel substrate comprises stainless steel.

* * * * *

UNITED STATES PATENT AND TRADEMARK OFFICE
CERTIFICATE OF CORRECTION

PATENT NO. : 5,049,443
DATED : September 17, 1991
INVENTOR(S) : Kuszaj et al.

It is certified that error appears in the above-identified patent and that said Letters Patent is hereby corrected as shown below:

On the cover, after "Filed: Dec. 12, 1990" add

-- Related U.S. Application Data

[63] Continuation of Ser. No. 07/400,289, Aug. 29, 1989, abandoned. --

Signed and Sealed this

Ninth Day of February, 1993

Attest:

STEPHEN G. KUNIN

*Attesting Officer*     *Acting Commissioner of Patents and Trademarks*